US010735479B2

(12) United States Patent
Padilla et al.

(10) Patent No.: US 10,735,479 B2
(45) Date of Patent: Aug. 4, 2020

(54) METHODS, SYSTEMS AND APPARATUS TO ENABLE VOICE ASSISTANT DEVICE COMMUNICATION

(71) Applicant: Intel Corporation, Santa Clara, CA (US)

(72) Inventors: Gabriel Padilla, Spring Valley, CA (US); Joel Klussman, San Marcos, CA (US)

(73) Assignee: Intel Corporation, Santa Clara, CA (US)

( * ) Notice: Subject to any disclaimer, the term of this patent is extended or adjusted under 35 U.S.C. 154(b) by 369 days.

(21) Appl. No.: 15/474,663

(22) Filed: Mar. 30, 2017

(65) Prior Publication Data

US 2018/0288104 A1   Oct. 4, 2018

(51) Int. Cl.
*G06F 15/16*   (2006.01)
*H04L 29/06*   (2006.01)
(Continued)

(52) U.S. Cl.
CPC .......... *H04L 65/1069* (2013.01); *G10L 15/22* (2013.01); *G10L 17/22* (2013.01); *H04L 12/282* (2013.01); *H04L 65/403* (2013.01)

(58) Field of Classification Search
CPC ..... H04L 12/282; H04L 51/043; H04L 51/10; H04L 51/20; G10L 15/22; G10L 2015/223; G10L 17/00
See application file for complete search history.

(56) References Cited

U.S. PATENT DOCUMENTS

2004/0125940 A1* 7/2004 Turcan ................ H04M 3/5183
                                                     379/265.13
2013/0203448 A1* 8/2013 Kang .................... H04W 4/025
                                                     455/457
(Continued)

OTHER PUBLICATIONS

Del Rey, "Amazon Plans to Release New Alexa Devices That Can Make Phone Calls and Work as Intercoms," recode, Mar. 3, 2017, retrieved from <http://www.recode.net/2017/3/3/14766486/new-amazon-alexa-echo-phon . . . >, retrieved on Mar. 7, 2017, 3 pages.

*Primary Examiner* — Oleg Survillo
(74) *Attorney, Agent, or Firm* — Hanley, Flight & Zimmerman, LLC

(57) ABSTRACT

Methods, apparatus, systems and articles of manufacture are disclosed to enable voice assistant device communication. An example apparatus includes an environment detector to receive a voice communication request associated with a target household member, the voice communication request to occur at an originating voice assistant device, a device map engine to query a location database to determine a match between one of a plurality of destination voice assistant devices and the target household member, a member discovery engine to transmit a location request to candidate ones of the plurality of destination voice assistant devices when the location database does not include a matching one of the plurality of destination voice assistant devices, and identify a voice signature of the target household member in response to the location request, the voice signature detected at one of the candidate ones of the plurality of destination voice assistant devices, and a broadcast engine to enable a communication session between the one of the candidate ones of the plurality of destination voice assistant devices and the originating voice assistant device.

17 Claims, 9 Drawing Sheets

(51) Int. Cl.
  *H04L 12/28* (2006.01)
  *G10L 15/22* (2006.01)
  *G10L 17/22* (2013.01)

(56) References Cited

U.S. PATENT DOCUMENTS

| | | | |
|---|---|---|---|
| 2015/0382138 A1* | 12/2015 | Bose | H04L 51/10 455/456.3 |
| 2018/0007210 A1* | 1/2018 | Todasco | H04M 3/53366 |
| 2018/0190285 A1* | 7/2018 | Heckmann | G06F 1/20 |
| 2018/0228006 A1* | 8/2018 | Baker | H05B 37/0236 |

* cited by examiner

400

| DEVICE ⌐402 | DEVICE NAME ⌐404 | HH MEMBER PROXIMITY ⌐406 | CANDIDATE OCCUPANT(S) ⌐408 | MOST RECENT SESSION ⌐420 | DO-NOT-DISTURB ⌐422 |
|---|---|---|---|---|---|
| 1 | KITCHEN | JOHN | N/A | √ | NO |
| 2 | LIVING ROOM | GUEST #1 | N/A | √ | NO |
| 3 | GARAGE | JANE, SUE | N/A | ... | NO |
| 4 | BEDROOM 1 | N/A | NO | ... | YES |
| 5 | BEDROOM 2 | ROBERT | N/A | ... | NO |
| 6 | BEDROOM 3 | N/A | YES | ... | NO |

(410 → row 1, 412 → row 2, 414 → row 3, 418 → row 4, 416 → row 6)

FIG. 4

METHODS, SYSTEMS AND APPARATUS TO ENABLE VOICE ASSISTANT DEVICE COMMUNICATION

FIELD OF THE DISCLOSURE

This disclosure relates generally to inter-home communication, and, more particularly, to methods, systems and apparatus to enable voice assistant device communication.

BACKGROUND

In recent years, voice assistant devices have become an increasingly common household appliance. Such voice assistant devices monitor a household room for occupant voice commands. In response to receiving a voice command, one or more activities may be invoked such as performing an Internet search, reciting corresponding information as a result of the search, updating calendar appointments, and controlling networked appliances, such as networked thermostats and/or networked lights.

BRIEF DESCRIPTION OF THE DRAWINGS

FIG. 4 is an example location table generated and updated by example intercom devices disclosed herein to track household members and device room nomenclature.

The figures are not to scale. Wherever possible, the same reference numbers will be used throughout the drawing(s) and accompanying written description to refer to the same or like parts.

DETAILED DESCRIPTION

Figure 1:
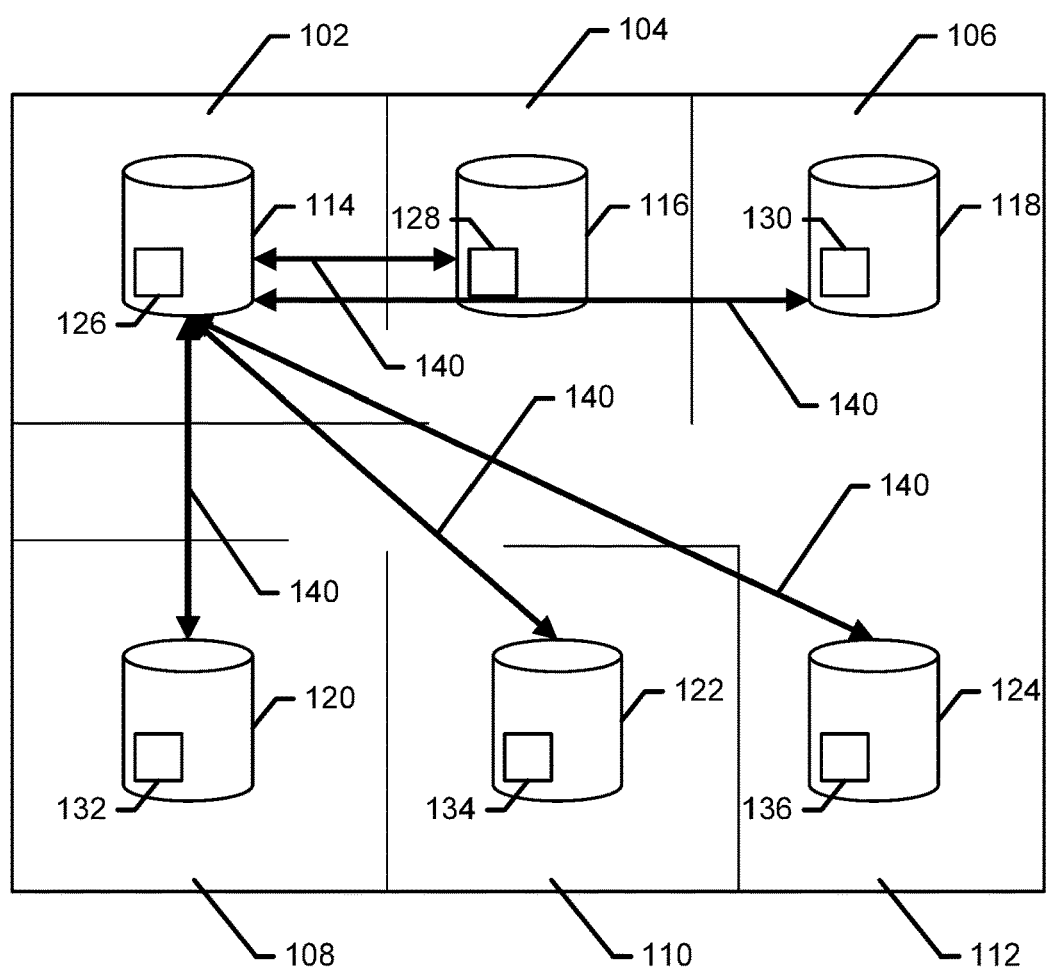
FIGS. 1, 2, 3A and 3B are schematic illustrations of example household and/or dwelling environments having example voice assistant devices and corresponding intercom devices to enable voice assistant device communication in accordance with the teachings of this disclosure.

As used herein, voice assistant devices, which are sometimes referred to herein as intelligent personal assistants or intelligent speakers, are networked devices that utilize language (e.g., via a microphone input(s)) as a user interface when providing services for occupants of a household or business. In response to a voice command, the assistant device may respond with information via an on-board speaker, and/or respond by performing a task (e.g., ordering goods/services, controlling switches, controlling thermostats, updating data (e.g., updating a shopping list), etc.). For example, in response to a verbal request regarding current weather conditions, the voice assistant device may utilize one or more networked data sources, retrieve relevant weather data, and recite such weather data (e.g., a current temperature associated with a region or zip code in which the voice assistant is being used) via the on-board speaker. In some examples, the voice assistant is communicatively connected to in-home controllable devices via a local area network (LAN). For example, a networked thermostat may be adjusted by one or more control commands sent by the voice assistant device in response to a verbal request to adjust the temperature of a room.

Example voice assistant devices disclosed herein typically communicate via one or more networks wirelessly (e.g., an 802.11x standard) or via a wired connection (e.g., CAT5 network cable) to a network switch, a router, or a modem. Additionally, example voice assistant devices disclosed herein typically require line voltage (e.g., 120 volts alternating current (VAC), 240 VAC), a direct current (DC) source (e.g., a power adapter to convert the line voltage to 5 VDC, 12 VDC, etc.), or are powered with batteries (e.g., rechargeable batteries). In some examples, the voice assistant devices are powered via the wired connection, such as power over Ethernet (POE). Accordingly, example voice assistant devices disclosed herein may be moved from room-to-room and/or otherwise placed in a room of the dwelling with relative ease. Such ease of placement and ease of relocation avoid costly in-wall hardwired connectivity between the example voice assistant devices.

Example voice assistant devices disclosed herein monitor a room with a microphone to detect a "wake" word or phrase. In some examples, the voice assistant device listens for the phrase "OK Google" for voice assistant devices manufactured by Google, and in some examples the voice assistant device listens for the word/name "Alexa" for voice assistant devices manufactured by Amazon (e.g., the Amazon Echo). Examples disclosed herein will use a variety of wake phrases, without limitation. In response to the wake word or phrase, example voice assistant devices listen for a subsequent question or task. For instance, the phrase "OK Google, what is the weather like today?" will cause the voice assistant device (e.g., the Google Home by Google) to perform a network (e.g., the Internet) query for weather information associated with a location of the voice assistant device. After obtaining the weather information, the example voice assistant device will recite the weather information via one or more on-board speakers. In still other examples, the phrase "Alexa, turn on the living room lights" will cause the voice assistant device (e.g., the Amazon Alexa) to send one or more control "ON" commands to light switches and/or network connected lights.

In some examples, a household, office, dwelling or retailer includes two or more voice assistant devices communicatively connected via one or more networks (e.g., a local area network (LAN), a wide area network (WAN), one or more interconnected LANs, etc.). Examples disclosed herein enable voice assistant device intercom communication for such households, offices, dwellings and/or retailers having two or more voice assistant devices located therein. Intercoms have typically been features of expensive homes and/or offices and required hard-wiring within such dwellings to facilitate end-to-end speaker and microphone communication between individual intercom stations (e.g., an intercom station having a microphone, a speaker and a wired connection(s) to one or more other intercom stations). However, unlike conventional and/or otherwise commercially available intercom systems, examples disclosed herein enable intercom communication between networked voice assistant devices.

In some examples, a voice prompt from a user is detected by a first voice assistant device in a first room, in which the voice prompt includes a command to cause the first voice assistant device to open a broadcast channel to a second voice assistant device in a second room. In some examples, the voice prompt from the user includes a command to cause the first voice assistant device to open the broadcast channel to the second voice assistant device in the second room in addition to opening the broadcast channel to any number of additional voice assistant devices in other rooms. As such, examples disclosed herein enable intercom communication between two or more voice assistant devices without an expense and/or labor associated with in-home wiring efforts. Unlike traditional intercom systems in which hard-wired connections facilitate intercom communication from one intercom station to another intercom station, examples disclosed herein open channels over a network, such as a wireless voice over Internet protocol (VoIP) channel.

FIG. 1 is a schematic illustration of an example household 100 having voice assistant devices located in different rooms. In particular, the example household 100 includes an example kitchen 102, an example living room 104, an example garage 106, an example first bedroom 108, an example second bedroom 110, and an example third bedroom 112. Each of the example rooms of the household 100 includes a corresponding voice assistant device. In the illustrated example of FIG. 1, the kitchen 102 includes a kitchen voice assistant device 114, the living room 104 includes a living room voice assistant device 116, the garage 106 includes a garage voice assistant device 118, the first bedroom 108 includes a first bedroom voice assistant device 120, the second bedroom 110 includes a second bedroom voice assistant device 122, and the third bedroom 112 includes a third bedroom voice assistant device 124.

In the illustrated example of FIG. 1, each voice assistant device includes a corresponding intercom engine, discussed in further detail below and in connection with FIG. 5, to enable intercom communication within the example household 100. In particular, the example kitchen voice assistant device 114 includes a kitchen intercom engine 126, the example living room voice assistant device 116 includes a living room intercom engine 128, the example garage voice assistant device 118 includes a garage intercom engine 130, the example first bedroom voice assistant device 120 includes a first bedroom intercom engine 132, the example second bedroom voice assistant device 122 includes a second bedroom intercom engine 134, and the example third bedroom voice assistant device 124 includes a third bedroom intercom engine 136. The aforementioned intercom engines may cooperate over a network to share information, such as information related to which occupants may be located in particular rooms of the example household 100, as discussed in further detail below. Although the illustrated example of FIG. 1 illustrates intercom engines located in respective voice assistant devices, examples disclosed herein may include a voice assistant device located in any computing device that is communicatively connected to a network of the example household 100.

Each of the example kitchen intercom engine 126, the example living room intercom engine 128, the example garage intercom engine 130, the example first bedroom intercom engine 132, the example second bedroom intercom engine 134 and the example third bedroom intercom engine 136 are communicatively connected via one or more networks by way of the networking capabilities of their corresponding voice assistant devices. In operation, if a household member that is located in the kitchen 102 recites a wake phrase and a corresponding task, such as the phrase "Alexa, open a broadcast channel" followed by an announcement to send to all voice assistant devices, such as "Everyone, dinner is ready." In response to receiving the aforementioned phrase, the example kitchen intercom engine 126 causes all of the networked voice assistant devices to open a broadcast channel so that both the microphone and speakers of each voice assistant device are enabled to facilitate verbal communication to all other voice assistant devices within the example household 100 (see open channel indication arrows 140 to indicate bi-directional broadcast capabilities between respective voice assistant devices). As such, in the event another household member in a different room (e.g., the example garage 106) responds by reciting "Okay, be there in five minutes," then all other voice assistant devices will cause that person's audio to be emanated from the speaker. In the event the respective intercom engines do not detect further voice discussions in any of the household rooms, then the previously opened broadcast channel is closed after a threshold amount of time (e.g., five seconds). In other examples, the original household member that initiated the broadcast channel may recite another phrase to close the broadcast channel, such as "Alexa, close the broadcast."

Figure 2:
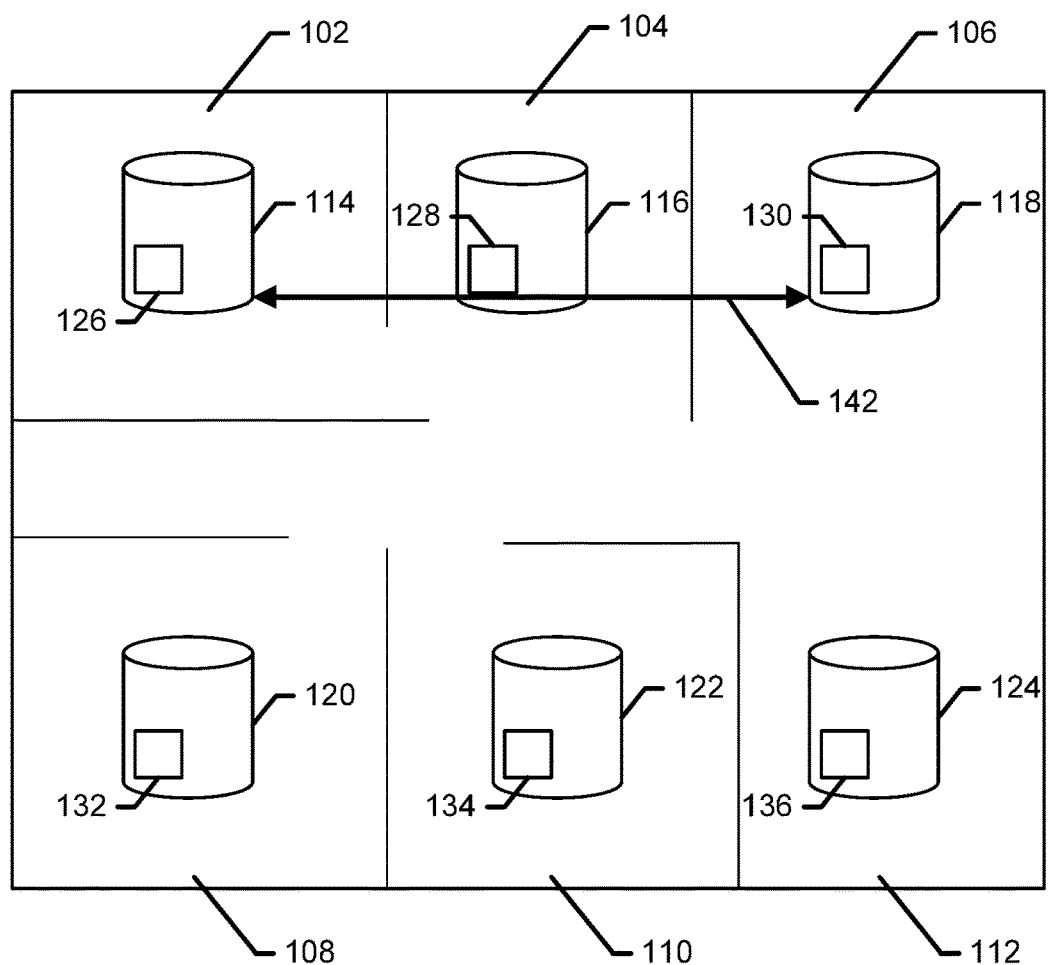

FIG. 2 is a schematic illustration of the example household 100 of FIG. 1 having the same voice assistant devices located in the different rooms. In the illustrated example of FIG. 2, a household member that is located in the kitchen 102 recites a wake phrase and a corresponding task, such as the phrase "Alexa, open a channel to the Garage." In response to receiving the aforementioned phrase, the example kitchen intercom engine 126 causes a room channel to be established between the originating voice assistant device (i.e., the kitchen voice assistant device 114) and a destination voice assistant device (i.e., the garage voice assistant device 118). As described in further detail below, each voice assistant device includes an associated room name to enable voice communications to particular rooms within the example household 100. Unlike the previous example, in which a broadcast channel is established for all voice assistant devices, the illustrated example of FIG. 2 establishes the room channel that is restricted to include only those voice assistant devices identified by the recited phrase, as shown by an example channel indication arrow 142 between the example kitchen 102 and the example garage 106. In other words, the room channel is established for the example kitchen voice assistant device 114 and the example garage voice assistant device 118, but the example living room voice assistant device 116, the example first bedroom voice assistant device 120, the example second bedroom voice assistant device 122, and the example third bedroom voice assistant device 124 do not participate in the established communication channel/session. In some examples, three or more rooms may be identified for multi-room communication, such as by reciting the phrase "Alexa, open a channel to the Garage and the Living Room."

Figure 3A:
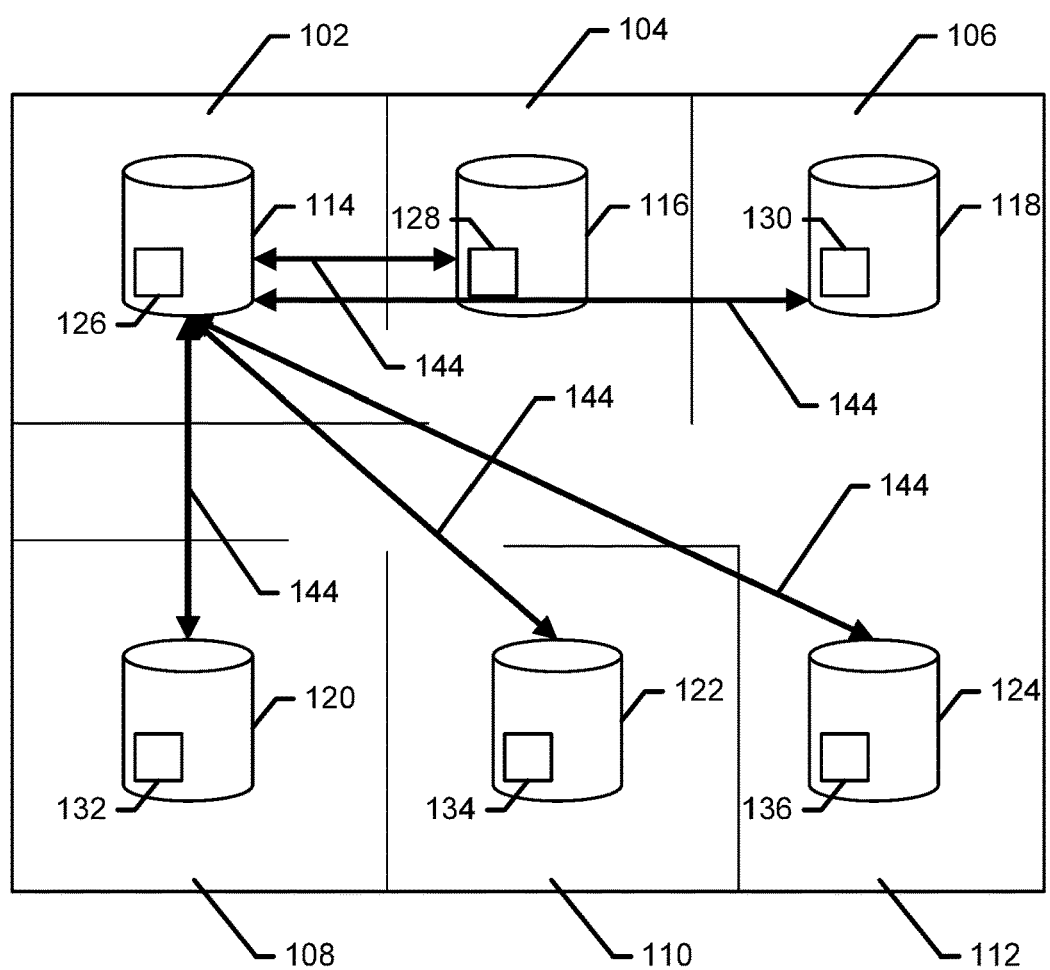

FIG. 3A is a schematic illustration of the example household 100 of FIGS. 1 and 2 having the same voice assistant devices located in the different rooms. In the illustrated example of FIG. 3A, a household member that is located in the kitchen 102 recites a wake phrase and a corresponding task to establish communication with a particular member of the household. For example, the household member located in the example kitchen 102 (e.g., Jane) may wish to speak with another household member named John, but Jane is not sure which room John might be located in. In response to Jane reciting the phrase "Alexa, open a channel with John," the example kitchen intercom engine 126 causes a broadcast channel to all networked voice assistant devices with a message "John, please respond to Jane," as illustrated by example channel indication arrows 144.

Figure 3B:
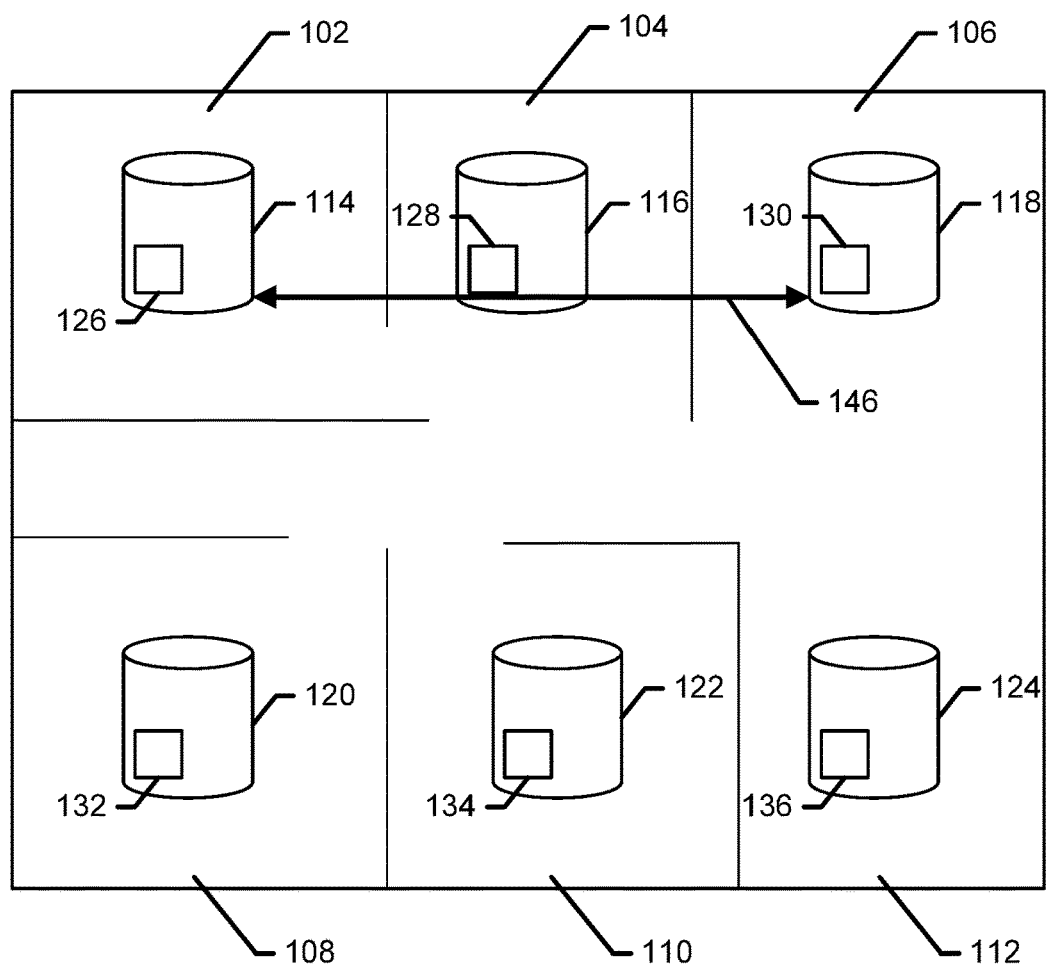

Turning to the illustrated example of FIG. 3B, the example kitchen intercom engine 126 also invokes all of the networked intercom engines to await a voice signature matching John. In response to detecting John's voice at a particular intercom engine, the example kitchen intercom engine 126 establishes a channel between the kitchen voice assistant device 114 and the corresponding voice assistant device in which John's voice was detected. In the illustrated example of FIG. 3B, John's voice was detected in the garage 106, and a corresponding channel is established between the example kitchen voice assistant device 114 and the example garage voice assistant device 118, as indicated by the example channel indication arrow 146. All other voice assistant devices are excluded from this channel 146.

In some examples, the intercom engine is aware of the location of respective household members. FIG. 4 is an example location table 400 that is populated and/or updated by respective intercom engines, such as the example kitchen intercom engine 126, the example living room intercom engine 128, the example garage intercom engine 130, the example first bedroom intercom engine 132, the example second bedroom intercom engine 134, and the example third bedroom intercom engine 136. In the illustrated example of FIG. 4, the location table includes a device column 402, a device name column 404, a household member proximity column 406, a candidate occupant column 408, a most recent intercom session column 420, and a do-not-disturb column 422. The example location table 400 of FIG. 4 indicates that the example household 100 includes six (6) devices, as identified by the example device column 402, in which each device includes related information on a row-by-row basis. In particular, an example first row 410 is associated with Device "1" named "kitchen," which references the example kitchen voice assistant device 114 shown in the illustrated examples of FIGS. 1, 2, 3A and 3B. In some examples, the device column 402 includes information uniquely associated with each voice assistant device, such as a unique identification number (e.g., a Media Access Control (MAC) address, an Internet protocol (IP) address, etc.).

The example household member proximity column 406 indicates that the example kitchen voice assistant device 114 is associated with household member "John." As described in further detail below, the example intercom engines monitor their respective rooms for voice signatures associated with registered household members and/or unregistered occupants (e.g., household guests). In the event a registered household member's voice is detected in a particular room, the example intercom engine within that room updates the example location table 400 with the respective member's name in the example household member proximity column 406. Similarly, in the event a voice not matching one or more of the registered household members is detected by a respective intercom engine, a corresponding name proxy is associated with the unregistered voice signature (e.g., Guest #1).

In some examples, the intercom engine detects noise or activity in a particular room that may not include human voices. This may suggest that a household member or guest is present in the room, but voice confirmation has not yet been established. In such circumstances, a respective intercom engine updates the example candidate occupant column 408 for a respective device (e.g., a second device in an example second row 412) with an indication that a member or occupant may be present in the associated room (e.g., the living room). In the illustrated example of FIG. 4, the candidate occupant column 408 may indicate the candidate presence of an occupant with "Yes" when room activity indicators (sounds) are detected therein, "No" when room activity indicators are absent, or "N/A" (not applicable) when an occupant is confirmed for that particular room.

The example most recent intercom session column 420 indicates which voice assistant devices were most recently involved in a communication session (e.g., an intercom session). In the illustrated example of FIG. 4, the example kitchen device (row 410) and the example living room device (row 412) include a check-mark in the example most recent intercom session 420. Such check-marks indicate that the most recent intercom sessions occurred between the example kitchen voice assistant device 114 and the example living room voice assistant device 116. As described in further detail below, information related to which voice assistant devices were most recently involved in an intercom session is useful when a participant wishes to re-establish another intercom session after the first intercom session terminates. More specifically, such information is particularly useful when one of the participants did not know which room and/or voice assistant device was being used during the previous/first intercom session, which typically terminates after a threshold period of voice silence (e.g., 5 seconds, 10 seconds, etc.).

The example do-not-disturb column 422 indicates which voice assistant devices should not participate in a request to locate a household member via a broadcast request. As described above, in the event Jane is located in the kitchen 102 and recites the phrase "Alexa, open a channel with John," the example intercom engine 126 causes a broadcast channel to all networked voice assistant devices except for those that indicate a do-not-disturb status is active (e.g., a "YES" designation in the example do-no-disturb column 422, see row 418).

Figure 5:
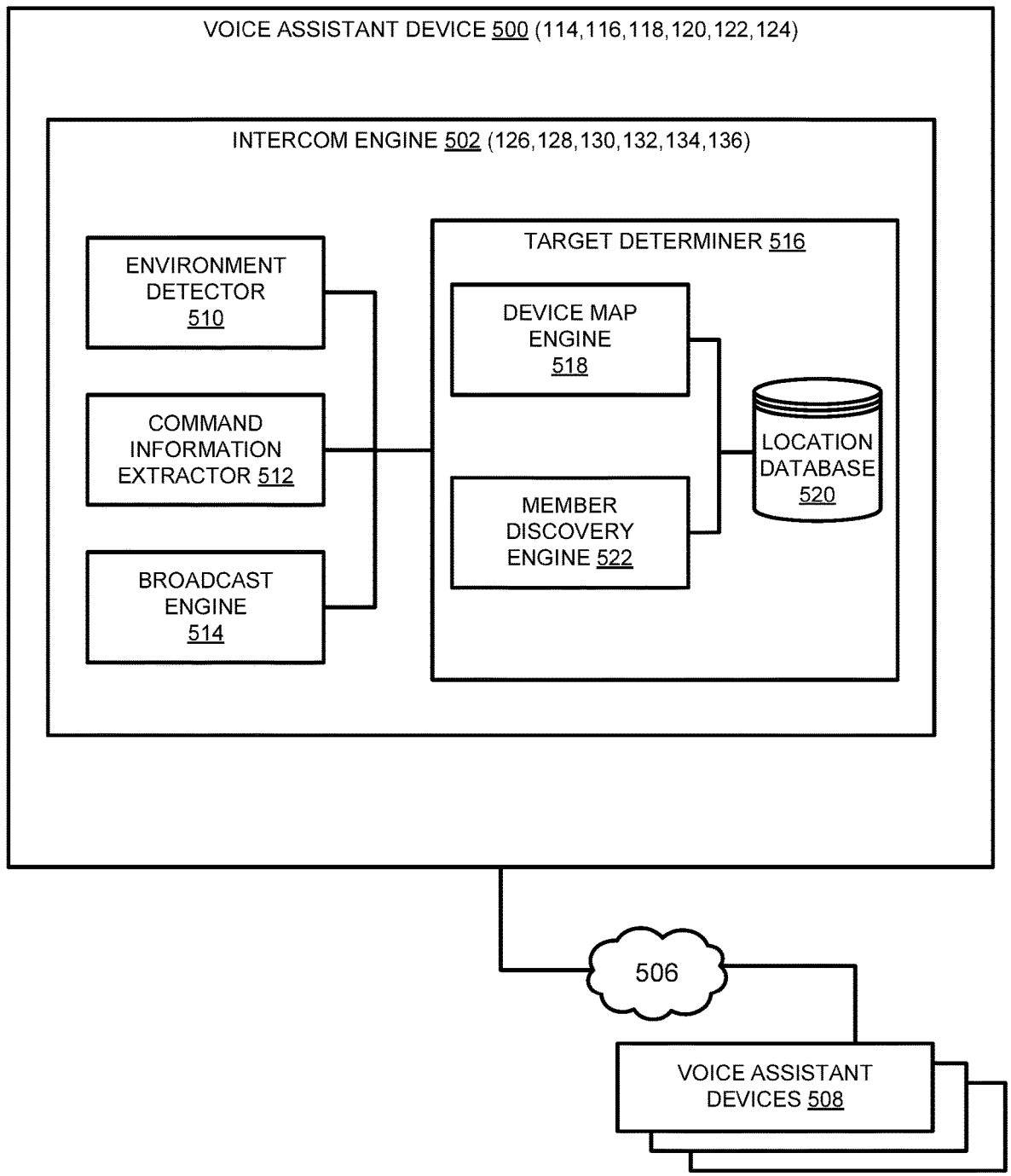
FIG. 5 is a schematic illustration of an example voice assistant device having an example intercom engine to enable voice assistant device communication in the example household and/or dwelling environments of FIGS. 1, 2, 3A and 3B.

FIG. 5 is a schematic illustration of an example voice assistant device 500 that includes a corresponding intercom engine 502. In the illustrated example of FIG. 5, the voice assistant device 500 is labeled with reference number "500" for ease of discussion, but the example voice assistant device 500 may represent the example kitchen voice assistant device 114, the example living room voice assistant device 116, the example garage voice assistant device 118, the example first bedroom voice assistant device 120, the example second bedroom voice assistant device 122, and/or the example third bedroom voice assistant device 124. In the illustrated example of FIG. 5, the intercom engine 502 is labeled with reference number "502" for ease of discussion, but the example intercom engine 502 may represent the example kitchen intercom engine 126, the example living room intercom engine 128, the example garage intercom engine 130, the example first bedroom intercom engine 132, the example second bedroom intercom engine 134, and/or the example third bedroom intercom engine 136.

The example voice assistant device 500 is communicatively connected to a network 506, such as a household LAN, a WAN, a wired/wireless network, etc. The example network 506 is also communicatively connected to one or more other voice assistant device(s) 508 within the example household 100. The example intercom engine 502 includes an example environment detector 510, an example command information extractor 512, an example broadcast engine 514 and an example target determiner 516. The example target determiner 516 includes an example device map engine 518 communicatively connected to an example last known location database 520 (also referred to herein as a location database or a location data store), and an example member discover engine 522. While the illustrated example of FIG. 5 shows the intercom engine 502 located within the example voice assistant device 500, examples disclosed herein are not limited thereto. In some examples, the intercom engine is located in a separate computing device (e.g., a personal computer, a server, etc.) communicatively connected to the example network 506. In such examples, the intercom engine 502 utilizes hardware capabilities of the communicatively connected voice assistant devices (e.g., microphones, speakers, etc.) to facilitate one or more functions disclosed herein. In such examples, a single copy of the example location table 400 may be stored on a "primary" device and updated as new and/or alternate information is detected by the one or more communicatively connected voice assistant devices. In some examples in which each voice assistant device includes a corresponding intercom engine 502, respective location tables may be kept current via network communication in the event data is changed (e.g., new data, alternate data, deleted data, etc.).

In operation, the example environment detector 510 determines if a voice command communication request (sometimes referred to herein as a voice command) has been detected. The example environment detector 510 may utilize one or more microphones contained therein to detect, retrieve and/or otherwise receive audio signals in an environment (e.g., room) in which the voice assistant device is located. In particular, the example environment detector 510 operates as an interface to its associated voice assistant device 500 and the input/output (I/O) resources thereof, such as a microphone, speakers, processor(s), voice recognition engine(s) and/or network interface(s). In response to detecting a command, the example command information extractor 512 extracts command information from the voice command recited by a user, such as a household member or guest occupant of the example household 100. Command information may include, but is not limited to a wake command, a task, a message or recited phrase, an indication of an origin device and/or an indication of one or more destination devices. The example broadcast engine 514 determines whether a message broadcast, such as an intercom session, is to be directed to all voice assistant devices within the example household 100 or to particular ones of the voice assistant devices within the example household 100.

For example, in the event a household member in the example kitchen 102 recites an intercom message command to be broadcast to all voice assistant devices (e.g., the example living room voice assistant device 116, the example garage voice assistant device 118, the example first bedroom voice assistant device 120, the example second bedroom voice assistant device 122, and the example third bedroom voice assistant device 124) within the example household 100, then the example broadcast engine 514 transmits the corresponding message, or enables an intercom session, to all available voice assistant devices within the example household 100. As described above, the intercom message may open one or more channels (e.g., VoIP channels) to enable full-duplex communication to/from the voice assistant devices, thereby allowing conversations to take place.

However, in the event a household member in the example kitchen 102 recites a command in which all available voice assistant devices are not to participate, then the target determiner 516 determines whether intercom communication capabilities are to occur between the origin voice assistant device (i.e., the example kitchen voice assistant device 114 in this example) and one or more destination voice assistant devices, or between the origin assistant device and a particular household member and/or occupant (e.g., Guest #1). Generally speaking, examples disclosed herein enable intercom functionality to one or more particular rooms in which a voice assistant device is located, in which each voice assistant device includes a corresponding label or name associated with the particular room. In such examples, an example voice command "OK Google, open a channel to the garage" will cause the origin voice assistant device to enable an intercom to the voice assistant device located in the garage, thereby allowing bi-directional voice communication between those occupants. However, in some examples there is a desire to contact a particular household member, but the exact room location of that household member is not known to the requestor. In such circumstances, examples disclosed herein facilitate a manner of discovering where the desired household member is located, and subsequently enabling an intercom channel to the appropriate room/device, as described in further detail below.

In some examples, an intercom broadcast session has occurred during a first time between two or more voice assistant devices. Continuing this example with two participants, during the first intercom broadcast session both voice assistant devices remain in a communication state in which the microphone and speakers remain active to allow both participants to conduct a conversation. After a threshold amount of time (e.g., 5 seconds, 10 seconds, etc.), the first intercom broadcast session ends and, thus, a microphone from a first voice assistant device no longer renders audio to a speaker of the destination voice assistant device. In some examples, one of the participants may wish to continue the conversation after the first intercom session has ended, but the participant may not know and/or otherwise remember which room the other participant was in. In such circumstances, the first participant may recite a voice command such as "OK Google, restart intercom" to reestablish an intercom session (a second intercom session). The example target determiner 516 determines that communication is to occur with a particular voice assistant device, and invokes the example device map engine to determine which voice assistant device was previously used for an intercom session during the first time. In particular, the example device map engine 518 queries (e.g., via a network interface, a network interface card, etc.) the example location database 520 for the example location table 400 stored therein. Returning briefly to the illustrated example of FIG. 4, the example most recent intercom session column 420 includes a check-mark associated with the example kitchen voice assistant device 114 and the example living room voice assistant device 116. With this information, the example broadcast engine 514 opens an intercom session between these devices to enable the second intercom session.

In some examples, a participant recites a phrase near an origin voice assistant device in which a corresponding destination voice assistant device is referred to in the phrase. For example, the participant may recite to the example kitchen voice assistant device "Alexa, open channel with garage." The example target determiner 516 determines that intercom communication is to occur with a specific device, and invokes the example broadcast engine 514 to open an intercom session between the example kitchen voice assistant device 114 (the origin device) and the example garage voice assistant device 118 (the destination device).

In some examples, the participant does not know where a desired household member is located and, additionally, may not want to conduct an intercom session with all networked voice assistant devices in the example household 100. In such circumstances, and assuming the participant is located near the example kitchen voice assistant device 114, the participant may recite "OK Google, open a channel with Jane." The example target determiner 516 determines that an intercom session is to be enabled with a particular person, but the location of that person is unknown to the requesting participant. As such, the example target determiner 516 invokes the example device map engine 518 to query the location database 520 for a voice assistant device associated with Jane. In particular, the example device map engine 518 queries the example location table 400 stored in the location database 520 for the household member "Jane," and identifies that Jane is associated with the example garage voice assistant device 118 (see row 414 of the illustrated example of FIG. 4). In view of a match between the desired household member and a corresponding voice assistant device, the example device map engine 518 invokes the example broadcast engine 514 to enable an intercom session between the example kitchen voice assistant device 114 and the example garage voice assistant device 118.

However, in some examples the location table 400 does not include information related to the location of a particular household member. Continuing with the example above, in which the participant is near the example kitchen voice assistant device 114 when reciting a voice command to enable an intercom session, the location of household member "Bill" is absent from the example location table 400 of FIG. 4. For instance, the participant may recite the command "OK Google, open a channel with Bill." When the example device map engine 518 determines that a match in the example location table 400 is not found, the example map engine 518 invokes the example member discovery engine 522 to transmit a household member location request to all networked voice assistant devices in the example household 100.

An example household member location request may include a broadcast message or prompt "Bill, do you have a minute to talk?" The example location request prompt may use a native personality voice generated by the example voice assistant device, such as the Alexa voice for Amazon-branded voice assistant devices, or a Google voice for Google-branded voice assistant devices, etc. In still other examples, the location request prompt may be a brief recording of the requesting participant that is broadcast to all available networked voice assistant devices. In the event another occupant responds to the location request prompt, the example member discovery engine 522 compares the response (e.g., "Hi, this is Bill and I am free to talk.") to one or more voice signatures stored in the example location database 520. If the response matches a signature associated with Bill, then the example member discovery engine 522 invokes the example broadcast engine 514 to enable/open an intercom session with the corresponding voice assistant device that detected Bill's voice. Additionally, the example device map engine 518 updates the example location table 400 to pair the detected household member with the corresponding voice assistant device for future reference.

While an example manner of implementing the intercom engine 502 of FIG. 5 is illustrated in FIGS. 1, 2, 3A, 3B, 4 and 5, one or more of the elements, processes and/or devices illustrated in FIG. 5 may be combined, divided, re-arranged, omitted, eliminated and/or implemented in any other way. Further, the example environment detector 510, the example command information extractor 512, the example broadcast engine 514, the example target determiner 516, the example device map engine 518, the example location database 520, the example member discovery engine 522 and/or, more generally, the example intercom engine 502 of FIG. 5 may be implemented by hardware, software, firmware and/or any combination of hardware, software and/or firmware. Thus, for example, any of the example environment detector 510, the example command information extractor 512, the example broadcast engine 514, the example target determiner 516, the example device map engine 518, the example location database 520, the example member discovery engine 522 and/or, more generally, the example intercom engine 502 of FIG. 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example environment detector 510, the example command information extractor 512, the example broadcast engine 514, the example target determiner 516, the example device map engine 518, the example location database 520, the example member discovery engine 522 and/or, more generally, the example intercom engine 502 of FIG. 5 is/are hereby expressly defined to include a tangible computer readable storage device or storage disk such as a memory, a digital versatile disk (DVD), a compact disk (CD), a Blu-ray disk, etc. storing the software and/or firmware. Further still, the example intercom engine 502 of FIG. 5 may include one or more elements, processes and/or devices in addition to, or instead of, those illustrated in FIG. 5, and/or may include more than one of any or all of the illustrated elements, processes and devices.

Figure 6:
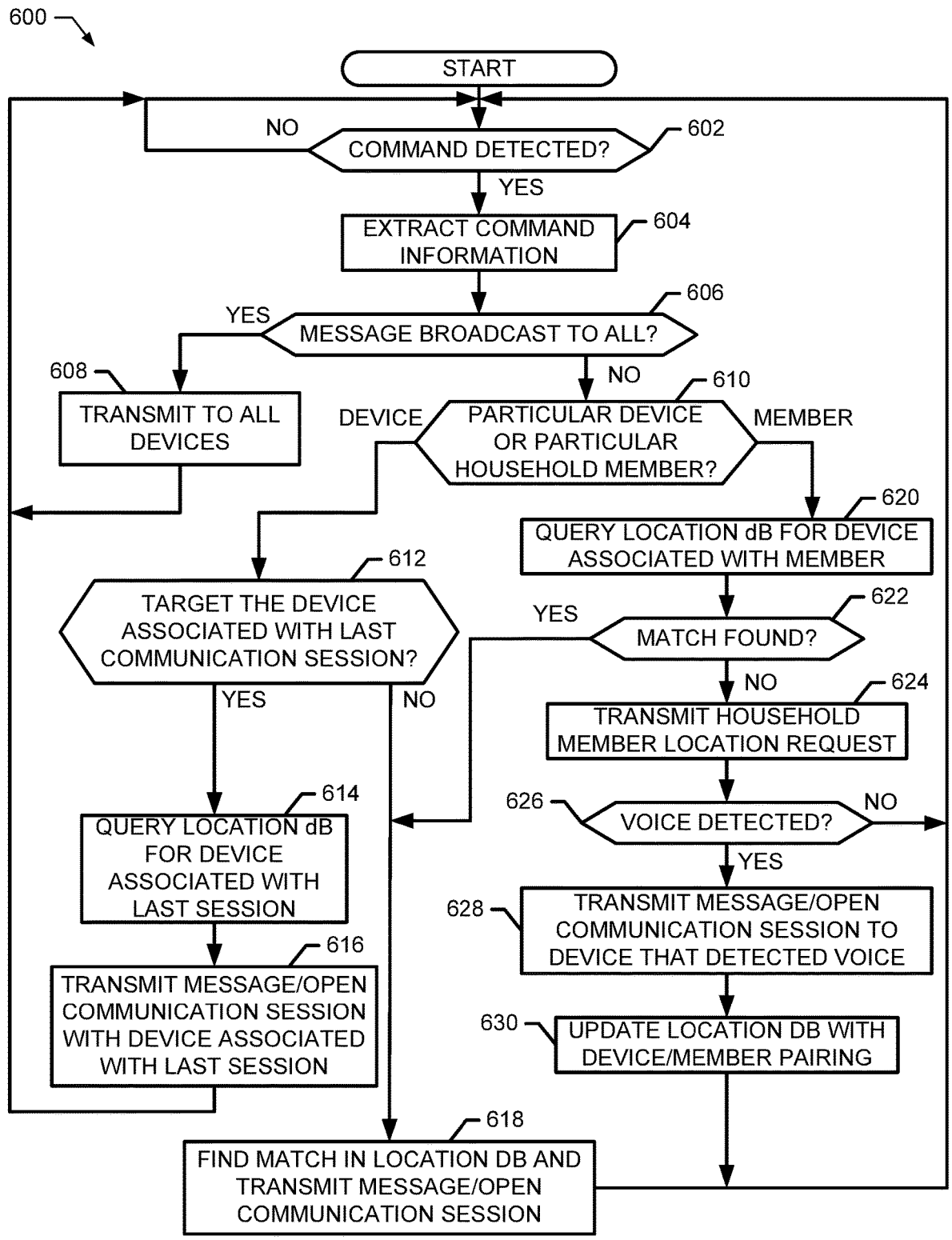
FIGS. 6 and 7 are flowcharts representative of example machine readable instructions that may be executed to implement the example voice assistant devices and intercom engines of FIG. 5 to enable voice assistant device communication.
Figure 7:
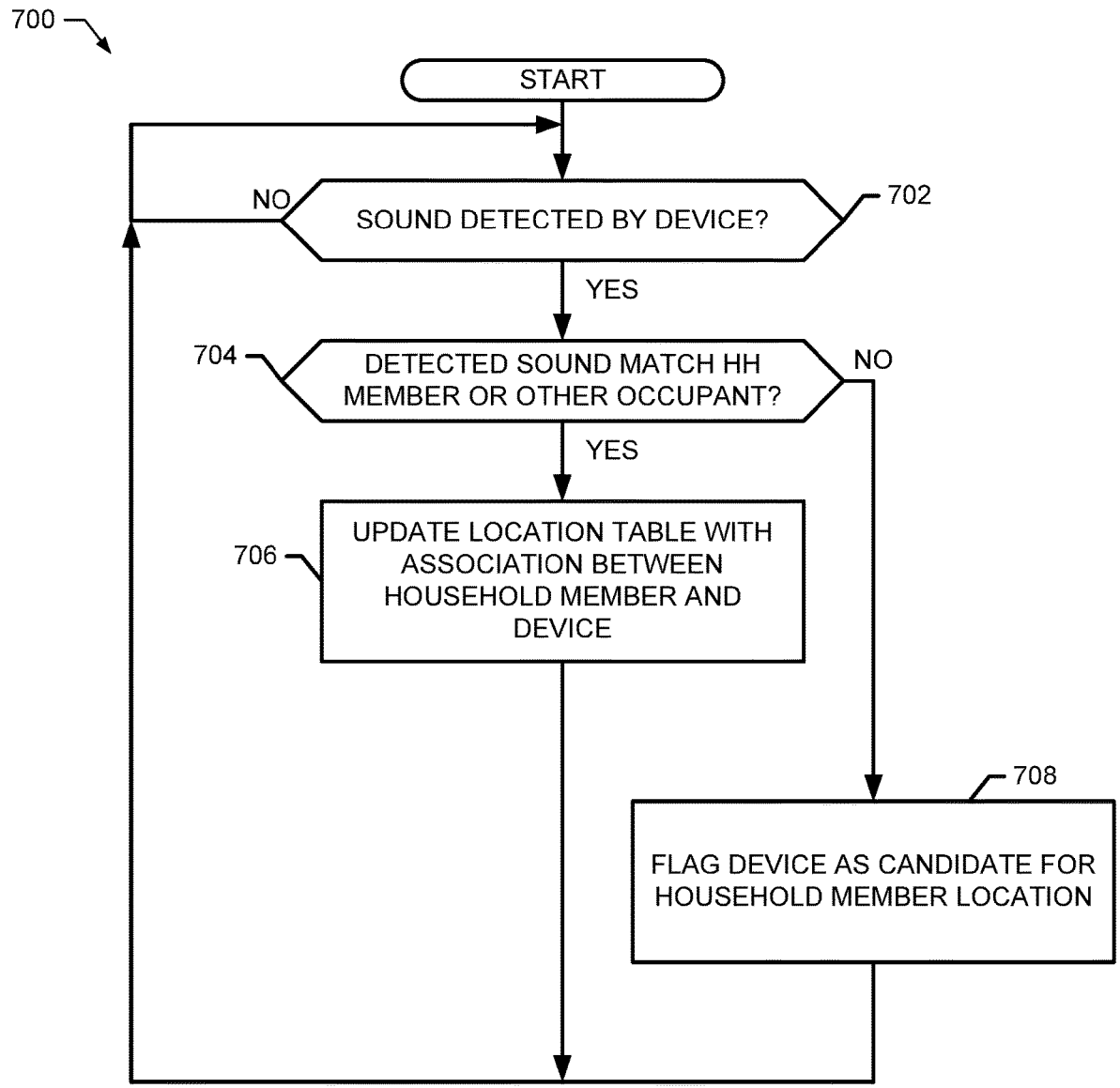

Flowcharts representative of example machine readable instructions for implementing the intercom engine 502 of FIG. 5 are shown in FIGS. 6-7. In these examples, the machine readable instructions comprise a program for execution by a processor such as the processor 812 shown in the example processor platform 800 discussed below in connection with FIG. 8. The programs may be embodied in software stored on a tangible computer readable storage medium such as a CD-ROM, a floppy disk, a hard drive, a digital versatile disk (DVD), a Blu-ray disk, or a memory associated with the processor 812, but the entire program(s) and/or parts thereof could alternatively be executed by a device other than the processor 812 and/or embodied in firmware or dedicated hardware. Further, although the example program is described with reference to the flowcharts illustrated in FIGS. 6-7, many other methods of implementing the example intercom engine 502 may alternatively be used. For example, the order of execution of the blocks may be changed, and/or some of the blocks described may be changed, eliminated, or combined.

As mentioned above, the example processes of FIGS. 6-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 600 of FIG. 6 begins at block 602, where the example environment detector 510 determines if a voice command has been detected. If not, the example environment detector 510 continues to wait for a voice command (block 602). However, in response to detecting a voice command (block 602), the example command information extractor 512 extracts command information from the voice command recited by a user (block 604), such as a household member or guest occupant of the example household 100. The example broadcast engine 514 determines whether a message broadcast is to be directed to all voice assistant devices within the example household 100 or to particular ones of the voice assistant devices within the example household (block 606).

If the voice command is intended to invoke an intercom session for all available networked voice assistant devices within the household 100 (block 606), or if the voice command is intended to cause a message to be sent to all available networked voice assistant devices within the household 100 (block 606), then the example broadcast engine 514 transmits the corresponding message, or enables an intercom session, to all available voice assistant devices within the example household 100 (block 608). In some examples where an intercom session is enabled by the example broadcast engine 514, a threshold period of time of silence causes the intercom session to terminate (e.g., after 5 seconds in which no participant speaks), and control returns to block 602.

On the other hand, if the voice command is not intended to invoke an intercom session for all available networked voice assistant devices within the household (block 606), or if the voice command is not intended to cause a message to be sent to all available networked voice assistant devices within the household 100 (block 606), then the example target determiner 516 determines a particular destination mode. Example destination modes include communication sessions targeting devices (e.g., a particular device associated with a target location name, such as a room name (e.g., the garage, the kitchen, etc.) or targeting occupants (e.g., a particular household member name). In particular, the example target determiner 516 determines whether the action(s) are directed to (a) a particular device (e.g., a room of the household) or (b) a particular household member (block 610). If the voice command is associated with a particular target device (block 610), then the example device map engine 518 determines whether the target device should be selected as the most recent device that participated in a communication session, such as a broadcast message or an intercom session (block 612). As described above, in some circumstances a previous/first communication session (e.g., a broadcast message or an intercom session) may have occurred in which one of the participants was unaware of the location of the other participant. Such a circumstance can occur when a first broadcast message from a participant is sent to a particular voice assistant device in a particular room at a first time. The receiving participant hears the broadcast message and/or participates in an intercom session at that first time, yet is unaware or otherwise not concerned of the originating participant's location during that communication session. After the previous/first communication session ends, the receiving participant may want to follow-up and/or otherwise continue the conversation and establish a second communication session with the originating party.

To do so, the receiving participant may recite a command such as "OK Google, restart intercom." The example device map engine 518 queries the example location database 520 for the example location table 400 stored therein to identify which voice assistant devices were previously participating in a communication session (block 614). With this information, the example broadcast engine 514 opens another communication session (e.g., an intercom session) between these devices to enable communication (block 616). However, if the voice command is not to target the voice assistant device associated with a previous communication session, and is instead to target a specific room (block 612), then the example broadcast engine 514 opens a communication session (e.g., an intercom session) between the origin voice assistant device and a named destination voice assistant device (block 618).

Returning to block 610, if the voice command is to target a specific household user, then the example device map engine 518 queries the location database 520 for a voice assistant device that is paired with and/or otherwise associated with the target household member (block 620). In particular, the example device map engine 518 parses the example location table 400 for the target household member name and if a match is found (block 622), then the example broadcast engine 514 opens a communication session (e.g., an intercom session) between the origin voice assistant device and the associated matching voice assistant device (block 618). On the other hand, if a match is not found (block 622), then the example member discovery engine 522 transmits a household member location request to all voice assistant devices (block 624).

If the target household member does not respond because none of the other voice assistant devices detect the target household member's voice (block 626), then control returns to block 602. This may occur if the target household member is not near any of the other voice assistant devices located in the example household 100. However, in the event one of the other voice assistant devices detects a voice match of the target household member (block 626), then the example broadcast engine 514 enables a communication session between the origin voice assistant device and the other voice assistant device with which the target household member's voice was detected (block 628). Additionally, the example device map engine 518 updates the example location table 400 to pair the target household member with the voice assistant device that just detected the target household member (block 630).

FIG. 7 is an example program 700 to maintain current locations of household members with respective voice assistant devices. As described above, because example voice assistant devices constantly monitor with one or more microphones for a "wake" word or phrase, examples disclosed herein may maintain and/or otherwise update the example location table 400 with pairings/associations between the household members and the respective voice assistant devices they might be near. The example program 700 of FIG. 7 may operate on a scheduled, periodic, aperiodic and/or manual basis to update the example location table 400.

In the illustrated example of FIG. 7, the example environment detector 510 determines if sound has been detected by one or more of the example voice assistant devices of the example household 100 (block 702). If not, then the example environment detector 510 waits for the next scheduled, periodic, aperiodic and/or manual iteration (block 702). However, in response to detecting a sound near one or more of the example voice assistant devices (block 702), the example member discovery engine 522 determines if the detected sound matches a household member's voice signature (block 704). If so, then the example device map engine 518 updates the example location table 400 (e.g., stored in the example location database 520) with a pairing/association between the detected voice signature and a corresponding voice assistant device that detected the signature (block 706). Such associations may occur when household members are speaking, but may not necessarily be interacting with the corresponding voice assistant device in the proximity of their speaking activity (e.g., talking on the phone, talking to other occupants, etc.).

In some examples, the detected sound is associated with human speech, but not necessarily speech that matches a voice signature of one or more of the household members. Such speech may be from occupant guests in the household that do not have a corresponding voice signature stored in the example location database 520. In such circumstances, the example device map engine 518 may store a guest voice signature in the example location database 520, and update the example location table 400 with an indication of that guest occupant. Turning briefly to the illustrated example location table 400 of FIG. 4, the example living room voice assistant device 116 has detected an occupant voice signature, which is labeled as "Guest #1" (see row 412).

In other examples, the detected sound is not associated with human speech (block 704), but may be indicative of activity in a particular room. For example, sounds relating to typing, office chair squeaking and/or eating may be detected by the example member discovery engine 522 to indicate presence of an occupant near one or more of the example voice assistant devices. Accordingly, the example device map engine 518 may flag those particular locations as candidate locations within which a household member may be located (block 708). Additionally, the example device map engine 518 updates the example location table 400 with an indication of human presence near the corresponding voice assistant device, as shown in the example candidate occupant column 408 of FIG. 4 (see row 416). In such circumstances, a voice command may target only those rooms having (a) a confirmed occupant or (b) a candidate occupant when enabling a communication session (e.g., an intercom session). This may be particularly useful when one or more of the rooms in which a voice assistant device is present includes a sleeping occupant, such as the example first bedroom that functions as a nursery (see row 418) of FIG. 4. In such circumstances, voice commands to locate members of the household may be targeted to all rooms of the example household 100 except the first bedroom 108 so that the sleeping occupant is not disturbed. As described above, if a particular room has an associated do-not-disturb indication active, such as the "YES" designation in the example do-not-disturb column 422 of FIG. 4 (see row 418), then such designated rooms will not be inundated with audio prompts.

Figure 8:
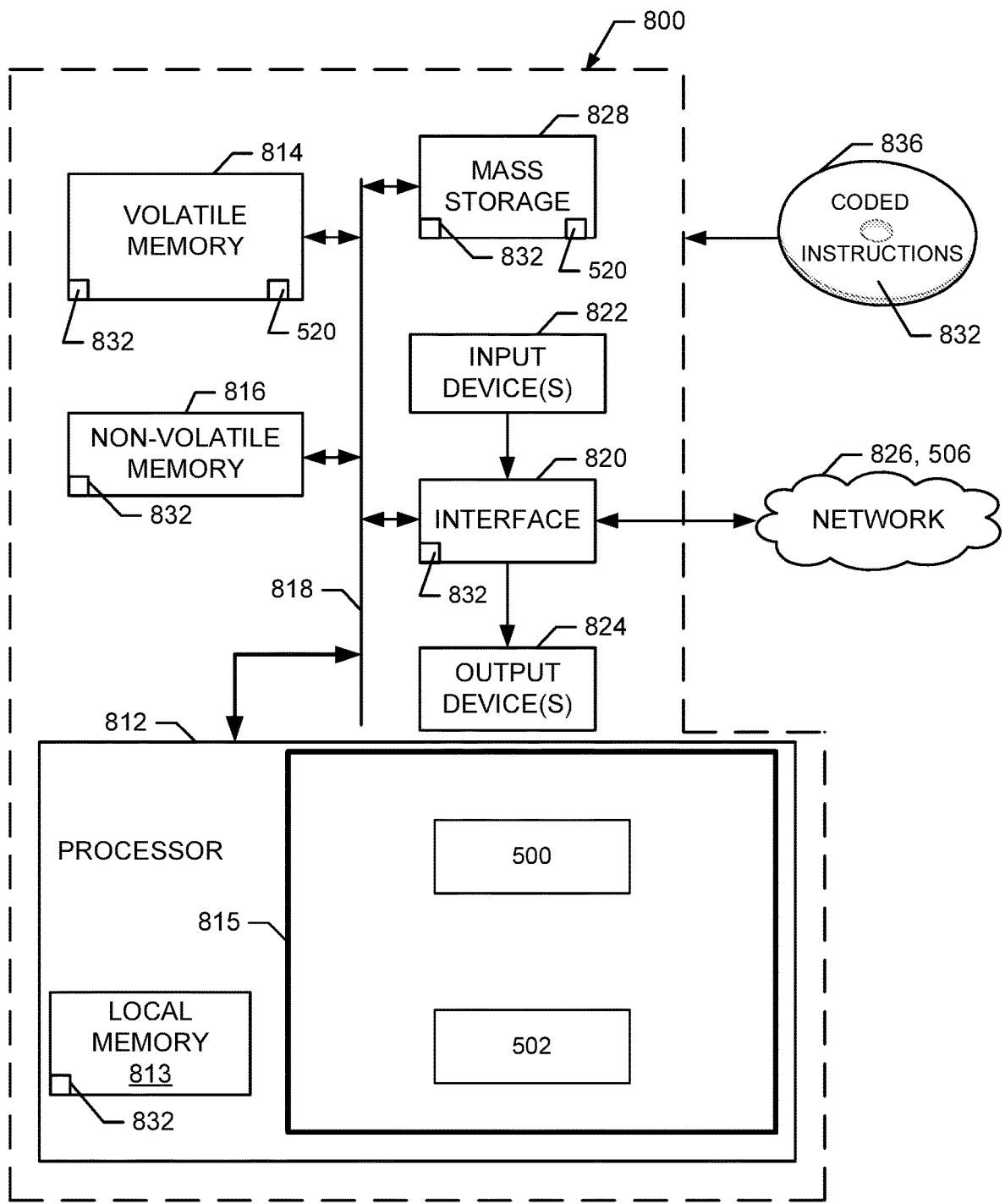
FIG. 8 is a block diagram of an example processor platform structured to execute the example machine readable instructions of FIGS. 6 and/or 7 to implement the example voice assistant devices and intercom engines of FIG. 5.

FIG. 8 is a block diagram of an example processor platform 800 capable of executing the instructions of FIGS. 6-7 to implement the apparatus of FIG. 5. The processor platform 800 can be, for example, a server, a personal computer, a mobile device (e.g., a cell phone, a smart phone, a tablet such as an iPad™), a personal digital assistant (PDA), an Internet appliance, a gaming console, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example of FIG. 8, the processor 812 is configured via example instructions 832, which include one or more of the example instructions of FIGS. 6 and/or 7 to implement the example voice assistant device 500 and/or the example intercom engine 502 of FIGS. 1, 2, 3A, 3B and/or 5. In the illustrated example of FIG. 8, the processor 812 includes one or more example processing cores 815 configured via example instructions 832, which include the example instructions of FIGS. 6 and/or 7.

The processor 812 of the illustrated example includes a local memory 813 (e.g., a cache). The processor 812 of the illustrated example is in communication with a main memory including a volatile memory 814 and a non-volatile memory 816 via a link 818 (e.g., a bus). The example link 818 may be implemented by a bus, one or more point-to-point connections, etc., or a combination thereof. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The example coded instructions 832 of FIGS. 6-7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, systems, apparatus and articles of manufacture enable communication between two or more voice assistant devices in an improved manner over traditional intercom systems. Examples disclosed herein enable particular household members to be located within a household or dwelling in circumstances where the requesting party is unaware of the exact location of the destination party. Examples disclosed herein utilize the voice assistant devices in a continuous manner to track the whereabouts of the household members by logging each household member to an associated voice assistant device. As such, transmitting global broadcast messages to all voice assistant devices when searching for a particular household member may be reduced. Additionally, examples disclosed herein enable communication sessions (e.g., intercom sessions) between household or dwelling rooms without the need to install in-home or in-dwelling wiring, as the communication sessions may utilize available wireless and/or wired networks already existing in the household/dwelling.

Example methods, apparatus, systems and articles of manufacture to enable voice assistant device communication are disclosed herein. Further examples and combinations thereof include the following.

Example 1 is an apparatus to enable voice assistant device communication, including an environment detector to receive a voice communication request associated with a target household member, the voice communication request to occur at an originating voice assistant device, a device map engine to query a location database to determine a match between one of a plurality of destination voice assistant devices and the target household member, a member discovery engine to transmit a location request to candidate ones of the plurality of destination voice assistant devices when the location database does not include a matching one of the plurality of destination voice assistant devices, and identify a voice signature of the target household member in response to the location request, the voice signature detected at one of the candidate ones of the plurality of destination voice assistant devices, and a broadcast engine to enable a communication session between the one of the candidate ones of the plurality of destination voice assistant devices and the originating voice assistant device.

Example 2 includes the apparatus as defined in example 1, wherein the location database includes a location table to store pairings between the target household member and the candidate ones of the plurality of destination voice assistant devices.

Example 3 includes the apparatus as defined in example 2, wherein the device map engine is to generate a pairing in the location table between the target household member and the one of the candidate ones of the plurality of destination voice assistant devices in response to identifying the voice signature of the target household member.

Example 4 includes the apparatus as defined in example 1, further including a target determiner to determine a destination mode of the voice communication request as at least one of the target household member or a target location name.

Example 5 includes the apparatus as defined in example 4, wherein the device map engine is to identify a respective one of the candidate ones of the plurality of destination voice assistant devices as associated with the target location name.

Example 6 includes the apparatus as defined in example 1, further including a target determiner to determine the voice communication request is associated with a target location name, the device map engine to query the location database for a match between one of the candidate ones of the plurality of destination voice assistant devices and the target location name.

Example 7 includes the apparatus as defined in example 6, wherein the broadcast engine is to enable the communication session between the originating voice assistant device and the one of the candidate ones of the plurality of destination voice assistant devices matching the target location name.

Example 8 includes the apparatus as defined in example 1, wherein the member discovery engine is to transmit the location request as an audio prompt to the candidate ones of the plurality of destination voice assistant devices.

Example 9 includes the apparatus as defined in example 1, wherein the member discovery engine is to transmit the location request as an audio prompt to a subset of the candidate ones of the plurality of destination voice assistant devices.

Example 10 includes the apparatus as defined in example 9, wherein the subset of the candidate ones of the plurality of destination voice assistant devices excludes candidate ones of the plurality of destination voice assistant devices associated with a do-not-disturb flag.

Example 11 includes the apparatus as defined in one of examples 2, 6, 8 or 9, wherein the broadcast engine is to enable the communication session as a voice over Internet protocol session between the originating voice assistant device and the one of the candidate ones of the plurality of destination voice assistant devices.

Example 12. A method to enable voice assistant device communication, including receiving a voice communication request associated with a target household member, the voice communication request occurring at an originating voice assistant device, querying a location database to determine a match between one of a plurality of destination voice assistant devices and the target household member, when the location database does not include a matching one of the plurality of destination voice assistant devices, transmitting a location request to candidate ones of the plurality of destination voice assistant devices, and identifying a voice signature of the target household member in response to the location request, the voice signature detected at one of the candidate ones of the plurality of destination voice assistant devices, and enabling a communication session between the one of the candidate ones of the plurality of destination voice assistant devices and the originating voice assistant device.

Example 13 includes the method as defined in example 12, further including storing pairings between the target household member and the candidate ones of the plurality of destination voice assistant devices.

Example 14 includes the method as defined in example 13, further including generating a pairing in the location table between the target household member and the one of the candidate ones of the plurality of destination voice assistant devices in response to identifying the voice signature of the target household member.

Example 15 includes the method as defined in example 12, further including determining a destination mode of the voice communication request as at least one of the target household member or a target location name.

Example 16 includes the method as defined in example 15, further including identifying a respective one of the candidate ones of the plurality of destination voice assistant devices as associated with the target location name.

Example 17 includes the method as defined in example 12, further including determining the voice communication request is associated with a target location name, the device map engine to query the location database for a match between one of the candidate ones of the plurality of destination voice assistant devices and the target location name.

Example 18 includes the method as defined in example 17, further including enabling the communication session between the originating voice assistant device and the one of the candidate ones of the plurality of destination voice assistant devices matching the target location name.

Example 19 includes the method as defined in example 12, further including transmitting the location request as an audio prompt to the candidate ones of the plurality of destination voice assistant devices.

Example 20 includes the method as defined in example 12, further including transmitting the location request as an audio prompt to a subset of the candidate ones of the plurality of destination voice assistant devices.

Example 21 includes the method as defined in example 20, wherein the subset of the candidate ones of the plurality of destination voice assistant devices excludes candidate ones of the plurality of destination voice assistant devices associated with a do-not-disturb flag.

Example 22 includes the method as defined in one of examples 13, 17, 19 or 20, further including enabling the communication session as a voice over Internet protocol session between the originating voice assistant device and the one of the candidate ones of the plurality of destination voice assistant devices.

Example 23 is a tangible computer readable storage medium including computer readable instructions that, when executed, cause one or more processors to, at least receive a voice communication request associated with a target household member, the voice communication request occurring at an originating voice assistant device, query a location database to determine a match between one of a plurality of destination voice assistant devices and the target household member, when the location database does not include a matching one of the plurality of destination voice assistant devices, transmit a location request to candidate ones of the plurality of destination voice assistant devices, and identify a voice signature of the target household member in response to the location request, the voice signature detected at one of the candidate ones of the plurality of destination voice assistant devices, and enable a communication session between the one of the candidate ones of the plurality of destination voice assistant devices and the originating voice assistant device.

Example 24 includes the storage medium as defined in example 23, wherein the computer readable instructions, when executed, further cause the processor to store pairings between the target household member and the candidate ones of the plurality of destination voice assistant devices.

Example 25 includes the storage medium as defined in example 24, wherein the computer readable instructions, when executed, further cause the processor to generate a pairing in the location table between the target household member and the one of the candidate ones of the plurality of destination voice assistant devices in response to identifying the voice signature of the target household member.

Example 26 includes the storage medium as defined in example 23, wherein the computer readable instructions, when executed, further cause the processor to determine a destination mode of the voice communication request as at least one of the target household member or a target location name.

Example 27 includes the storage medium as defined in example 26, wherein the computer readable instructions, when executed, further cause the processor to identify a respective one of the candidate ones of the plurality of destination voice assistant devices as associated with the target location name.

Example 28 includes the storage medium as defined in example 23, wherein the computer readable instructions, when executed, further cause the processor to determine the voice communication request is associated with a target location name, the device map engine to query the location database for a match between one of the candidate ones of the plurality of destination voice assistant devices and the target location name.

Example 29 includes the storage medium as defined in example 28, wherein the computer readable instructions, when executed, further cause the processor to enable the communication session between the originating voice assistant device and the one of the candidate ones of the plurality of destination voice assistant devices matching the target location name.

Example 30 includes the storage medium as defined in example 23, wherein the computer readable instructions, when executed, further cause the processor to transmit the location request as an audio prompt to the candidate ones of the plurality of destination voice assistant devices.

Example 31 includes the storage medium as defined in example 23, wherein the computer readable instructions, when executed, further cause the processor to transmit the location request as an audio prompt to a subset of the candidate ones of the plurality of destination voice assistant devices.

Example 32 includes the storage medium as defined in example 31, wherein the computer readable instructions, when executed, further cause the processor to exclude candidate ones of the plurality of destination voice assistant devices associated with a do-not-disturb flag.

Example 33 includes the storage medium as defined in one of examples 24, 28, 30 or 31, wherein the computer readable instructions, when executed, further cause the processor to enable the communication session as a voice over Internet protocol session between the originating voice assistant device and the one of the candidate ones of the plurality of destination voice assistant devices.

Example 34 is a system to enable voice assistant device communication, including means for receiving a voice communication request associated with a target household member, the voice communication request occurring at an originating voice assistant device, means for querying a location database to determine a match between one of a plurality of destination voice assistant devices and the target household member, when the location database does not include a matching one of the plurality of destination voice assistant devices, means for transmitting a location request to candidate ones of the plurality of destination voice assistant devices, and means for identifying a voice signature of the target household member in response to the location request, the voice signature detected at one of the candidate ones of the plurality of destination voice assistant devices, and means for enabling a communication session between the one of the candidate ones of the plurality of destination voice assistant devices and the originating voice assistant device.

Example 35 includes the system as defined in example 34, further including means for storing pairings between the target household member and the candidate ones of the plurality of destination voice assistant devices.

Example 36 includes the system as defined in example 35, further including means for generating a pairing in the location table between the target household member and the one of the candidate ones of the plurality of destination voice assistant devices in response to identifying the voice signature of the target household member.

Example 37 includes the system as defined in example 34, further including means for determining a destination mode of the voice communication request as at least one of the target household member or a target location name.

Example 38 includes the system as defined in example 37, further including means for identifying a respective one of the candidate ones of the plurality of destination voice assistant devices as associated with the target location name.

Example 39 includes the system as defined in example 34, further including means for determining the voice communication request is associated with a target location name, the device map engine to query the location database for a match between one of the candidate ones of the plurality of destination voice assistant devices and the target location name.

Example 40 includes the system as defined in example 39, further including means for enabling the communication session between the originating voice assistant device and the one of the candidate ones of the plurality of destination voice assistant devices matching the target location name.

Example 41 includes the system as defined in example 34, further including means for transmitting the location request as an audio prompt to the candidate ones of the plurality of destination voice assistant devices.

Example 42 includes the system as defined in example 34, further including means for transmitting the location request as an audio prompt to a subset of the candidate ones of the plurality of destination voice assistant devices.

Example 43 includes the system as defined in example 42, wherein the subset of the candidate ones of the plurality of destination voice assistant devices excludes candidate ones of the plurality of destination voice assistant devices associated with a do-not-disturb flag.

Example 44 includes the system as defined in one of examples 35, 39, 41 or 42, further including means for enabling the communication session as a voice over Internet protocol session between the originating voice assistant device and the one of the candidate ones of the plurality of destination voice assistant devices.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to establish voice assistant device communication, comprising:
   receiving, by executing an instruction with at least one processor, a voice communication request occurring at an originating voice assistant device;
   determining, by executing an instruction with the at least one processor, a destination mode of the voice communication request as a target household member;
   querying, by executing an instruction with the at least one processor, a location database to determine a match between one of a plurality of destination voice assistant devices and the target household member;
   in response to the location database not including the match between one of the plurality of destination voice assistant devices and the target household member:
   determining, by executing an instruction with the at least one processor, candidate ones of the plurality of destination voice assistant devices when ones of the plurality of destination voice assistant devices detect sound indicative of activity;
   transmitting, by executing an instruction with the at least one processor, a location request to the candidate ones of the plurality of destination voice assistant devices with the target household member; and
   identifying, by executing an instruction with the at least one processor, a voice signature of the target household member in response to the location request, the voice signature detected at one of the candidate ones of the plurality of destination voice assistant devices; and
   establishing, by executing an instruction with the at least one processor, a communication session between the one of the candidate ones of the plurality of destination voice assistant devices and the originating voice assistant device.

2. The method as defined in claim 1, further including storing pairings between the target household member and the candidate ones of the plurality of destination voice assistant devices.

3. The method as defined in claim 1, further including in response to determining the voice communication request is associated with a target location name, query the location database for a match between one of the candidate ones of the plurality of destination voice assistant devices and a target location name.

4. The method as defined in claim 3, further including establishing the communication session between the originating voice assistant device and the one of the candidate ones of the plurality of destination voice assistant devices matching the target location name.

5. An apparatus to establish voice assistant device communication, comprising:
   an environment detector to receive a voice communication request, the voice communication request to occur at an originating voice assistant device;
   a target determiner to determine a destination mode of the voice communication request as a target household member;
   a device map engine to query a location database to determine a match between one of a plurality of destination voice assistant devices and the target household member;
   when the location database does not include the match between one of the plurality of destination voice assistant devices and the target household member, a member discovery engine to:

determine candidate ones of the plurality of destination voice assistant devices when ones of the plurality of destination voice assistant devices detect sound indicative of activity;

transmit a location request to the candidate ones of the plurality of destination voice assistant devices; and identify a voice signature of the target household member in response to the location request, the voice signature detected at one of the candidate ones of the plurality of destination voice assistant devices; and a broadcast engine to establish a communication session between the one of the candidate ones of the plurality of destination voice assistant devices and the originating voice assistant device, at least one of the environment detector, the target determiner, the device map engine, the member discovery engine, or the broadcast engine implemented by a processor.

6. The apparatus as defined in claim 5, wherein the location database includes a location table to store pairings between the target household member and the candidate ones of the plurality of destination voice assistant devices.

7. The apparatus as defined in claim 6, wherein the device map engine is to generate a pairing in the location table between the target household member and the one of the candidate ones of the plurality of destination voice assistant devices in response to identifying the voice signature of the target household member.

8. The apparatus as defined in claim 5, wherein the device map engine is to identify a respective one of the candidate ones of the plurality of destination voice assistant devices as associated with a target location name.

9. The apparatus as defined in claim 5, wherein the target determiner is to determine the voice communication request is associated with a target location name, the device map engine to query the location database for a match between one of the candidate ones of the plurality of destination voice assistant devices and the target location name.

10. The apparatus as defined in claim 9, wherein the broadcast engine is to establish the communication session between the originating voice assistant device and the one of the candidate ones of the plurality of destination voice assistant devices matching the target location name.

11. The apparatus as defined in claim 5, wherein the member discovery engine is to transmit the location request as an audio prompt to the candidate ones of the plurality of destination voice assistant devices.

12. A tangible computer readable storage medium comprising computer readable instructions that, when executed, cause one or more processors to, at least:

receive a voice communication request at an originating voice assistant device;

determine a destination mode of the voice communication request as a target household member;

query a location database to determine a match between one of a plurality of destination voice assistant devices and the target household member;

when the location database does not include the match between one of the plurality of destination voice assistant devices and the target household member:

determine candidate ones of the plurality of destination voice assistant devices when ones of the plurality of destination voice assistant devices detect sound indicative of activity;

transmit a location request to the candidate ones of the plurality of destination voice assistant devices with the target household member;

identify a voice signature of the target household member in response to the location request, the voice signature detected at one of the candidate ones of the plurality of destination voice assistant devices; and establish a communication session between the one of the candidate ones of the plurality of destination voice assistant devices and the originating voice assistant device.

13. The storage medium as defined in claim 12, wherein the computer readable instructions, when executed, further cause the one or more processors to store pairings between the target household member and the candidate ones of the plurality of destination voice assistant devices.

14. The storage medium as defined in claim 13, wherein the computer readable instructions, when executed, further cause the one or more processors to generate a pairing in a location table between the target household member and the one of the candidate ones of the plurality of destination voice assistant devices in response to identifying the voice signature of the target household member.

15. The storage medium as defined in claim 12, wherein the computer readable instructions, when executed, further cause the one or more processors to identify a respective one of the candidate ones of the plurality of destination voice assistant devices as associated with a target location name.

16. The storage medium as defined in claim 12, wherein the computer readable instructions, when executed, further cause the one or more processors to query the location database for a match between one of the candidate ones of the plurality of destination voice assistant devices and the target household member when the one or more processors determine the voice communication request is associated with a target location name.

17. The storage medium as defined in claim 16, wherein the computer readable instructions, when executed, further cause the one or more processors to establish the communication session between the originating voice assistant device and the one of the candidate ones of the plurality of destination voice assistant devices matching the target location name.

* * * * *